Dec. 25, 1928.
P. W. FORSBERG
1,696,599
REGENERATIVE BRAKING
Filed Nov. 3, 1925
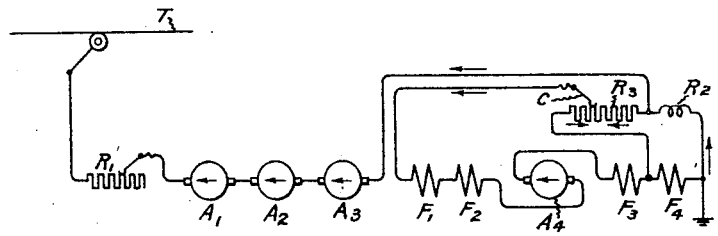
Inventor:
Peter W. Forsberg,
by *[signature]*
His Attorney.

Patented Dec. 25, 1928.

1,696,599

UNITED STATES PATENT OFFICE.

PETER W. FORSBERG, OF SCHENECTADY, NEW YORK, ASSIGNOR TO GENERAL ELECTRIC COMPANY, A CORPORATION OF NEW YORK.

REGENERATIVE BRAKING.

Application filed November 3, 1925. Serial No. 66,620.

This invention relates to electric braking systems and more particularly to regenerative braking systems for electric locomotives or the like, wherein a portion of the driving motors is used to over-excite the remainder of the motors so as to return current to the supply line and thereby produce an electric braking effect to retard the locomotive.

In my prior Patent, No. 1,421,931, dated July 4, 1922, I have fully described and broadly claimed a regenerative braking system of the above character which automatically and inherently compensates for fluctuations in the supply line voltage. The present invention is an improvement upon my prior braking system and is intended to amplify the compensation for fluctuations in the supply line voltage beyond that obtained in my patented system. By means of my present invention the compensation for fluctuations in the supply line voltage and consequently for variations in the regenerative braking current are produced substantially in accordance with the rate of variation in the braking current.

Briefly, this is accomplished in accordance with my present invention by means of a resistance having also a relatively high inductance which preferably is connected in shunt with the field winding of the exciter portion of the driving motors during regenerative braking operation and arranged to carry a portion of the exciting current of the motors, as well as the braking current generated by the remainder of the motors. The arrangement is such that the exciting current of the motors flows through the inductive resistance in the same direction as the braking current of the motors. Hence upon a sudden fluctuation in the line voltage tending to produce a rapid increase in the braking current, the voltage induced in the inductive resistance by the sudden increase in braking current opposes the exciter voltage normally supplying current to the field windings of the motors and causes a correspondingly rapid decrease in the exciting current thereof. The resulting decreased excitation of the motors at once reduces the voltage of the motors and consequently maintains the braking current at substantially the same value as before the sudden drop in the supply line voltage. Thus, it will be seen that the braking current is automatically maintained within the safe operating limits of the motors, even with severe fluctuations in the supply line voltage.

The invention may be better understood from the following description of the accompanying drawing, in which the single figure shows the present invention embodied in a regenerative braking control system for an electric locomotive of the type set forth in my prior Patent, No. 1,421,931.

Referring to the drawing, it will be seen that the regenerative braking control system illustrated is similar to one form of my patented braking system, in which a portion of the armatures $A_1$, $A_2$, $A_3$, of the locomotive driving motors is connected in series with the current regulating resistor $R_1$ and the by-pass resistor $R_2$ between the supply line T and ground to form the regenerative braking circuit. Another portion of the armatures ($A_4$) serves as an exciter and is connected to supply a current to the field windings $F_1$, $F_2$, $F_3$, $F_4$ of the corresponding motors $A_1$, $A_2$, $A_3$, $A_4$, in order to over-excite the motors $A_1$, $A_2$, $A_3$ during regenerative braking operation. It will be observed that the excitation circuit of the field windings $F_1$, $F_2$, $F_3$, extends through a portion of the regulating resistor $R_3$, while the field winding $F_4$ is connected in shunt with the by-pass resistor $R_2$ and the other portion of the regulating resistor $R_3$.

In accordance with my present invention, the by-pass resistor $R_2$ is designed to have a relatively large inductance, preferably equal to, or greater than, the inductance of the field winding $F_4$. As more fully described in my prior Patent, No. 1,421,931, the braking current generated by the armatures $A_1$, $A_2$, $A_3$, during regenerative braking operation flows from ground through the inductive by-pass resistor $R_2$ to the trolley T, in the direction indicated by the arrows and the exciting current supplied by the armature $A_4$ likewise flows through the resistors $R_2$, $R_3$, and the field windings $F_1$, $F_2$, $F_3$, $F_4$, in the directions indicated by the arrows. By varying the current limiting resistor $R_1$ the flow of the braking current may be varied, and by varying the position of the adjustable contact C along the resistor $R_3$, the flow of the exciting current may be varied.

The inductance of the by-pass resistor $R_2$ amplifies the compensation for variations or fluctuations in the voltage of supply line T in accordance with the resulting rate of variation of the braking current in the following manner. Upon a sudden drop in the voltage of supply line T, such as may occur upon failure of the supply source or grounding of the supply line itself, the braking current flowing through the inductive resistor $R_2$ tends to rapidly increase. However, the voltage across the resistance $R_2$ at once increases in accordance with the rate of increase of the braking current due to the inductive characteristics of this resistor as well as directly in accordance with the voltage drop across the resistance due to the increased value of the braking current. The induced voltage across the resistor $R_2$ directly opposes the voltage of the exciter armature $A_4$ and is effective to immediately reduce the value of the exciting current flowing through the field windings $F_1$, $F_2$, $F_3$, as well as the field winding $F_4$. Thereupon the resulting reduced excitation of exciter $A_4$ further decreases the value of the energizing current supplied to the field windings $F_1$, $F_2$, $F_3$. Consequently, the voltage generated by corresponding armatures $A_1$, $A_2$, $A_3$ is reduced thus preventing the braking current generated thereby from reaching a high value which might cause series arcing or flashover of the braking motors. With the inductance of the by-pass resistor $R_2$ equal to, or greater than, the inductance of the field windings $F_4$, the decreased excitation of the braking motors $A_1$, $A_2$, $A_3$ is produced in accordance with the rate of variation in the braking current and hence occurs practically simultaneously with a drop in the voltage of the supply line T.

What I claim as new and desire to secure by Letters Patent of the United States, is:

1. A regenerative braking system comprising a plurality of dynamo electric machines, a resistor connected so that one portion of the armatures of said machines and the said resistor form a braking circuit and another portion of the armatures of the machines and the field windings of all the machines and the said resistor form an excitation circuit, the said resistor having an appreciable inductance whereby sudden variations in the current in the braking circuit induce variations in the current in the exciting circuit in the opposite direction and in accordance with the rate of variation of the braking current.

2. A regenerative braking system comprising a plurality of dynamo electric machines, a resistor connected in series with one portion of the armatures of said machines to form a braking circuit, and connections through which another portion of the armatures of the machines supply exciting current to the field windings of all the machines with the said resistor in shunt to the field windings of the said exciter portion of the machines, the said resistor having an appreciable inductance whereby a sudden increase in the braking current induces a decrease in the exciting current of the machines in accordance with the rate of increase of the braking current.

3. A regenerative braking system comprising a plurality of dynamo electric machines, a resistor connected in series with a portion of the armatures of said machines to form a braking circuit, a second resistor and connections through which another portion of the armatures of the dynamo electric machines supply exciting current to the field windings of the braking portion of the machines through one portion of said second resistor and to the field windings of the exciter portion of the machines through said first resistor and another portion of said second resistor, the said first resistor having a materially higher inductance than the first said resistor whereby a sudden increase in the current in the braking circuit induces a decrease in the exciting current of the field windings of said exciter portion of the machines in accordance with the rate of increase of the current in the braking circuit.

In witness whereof, I have hereunto set my hand this twentieth day of October, 1925.

PETER W. FORSBERG.